Figure 1:
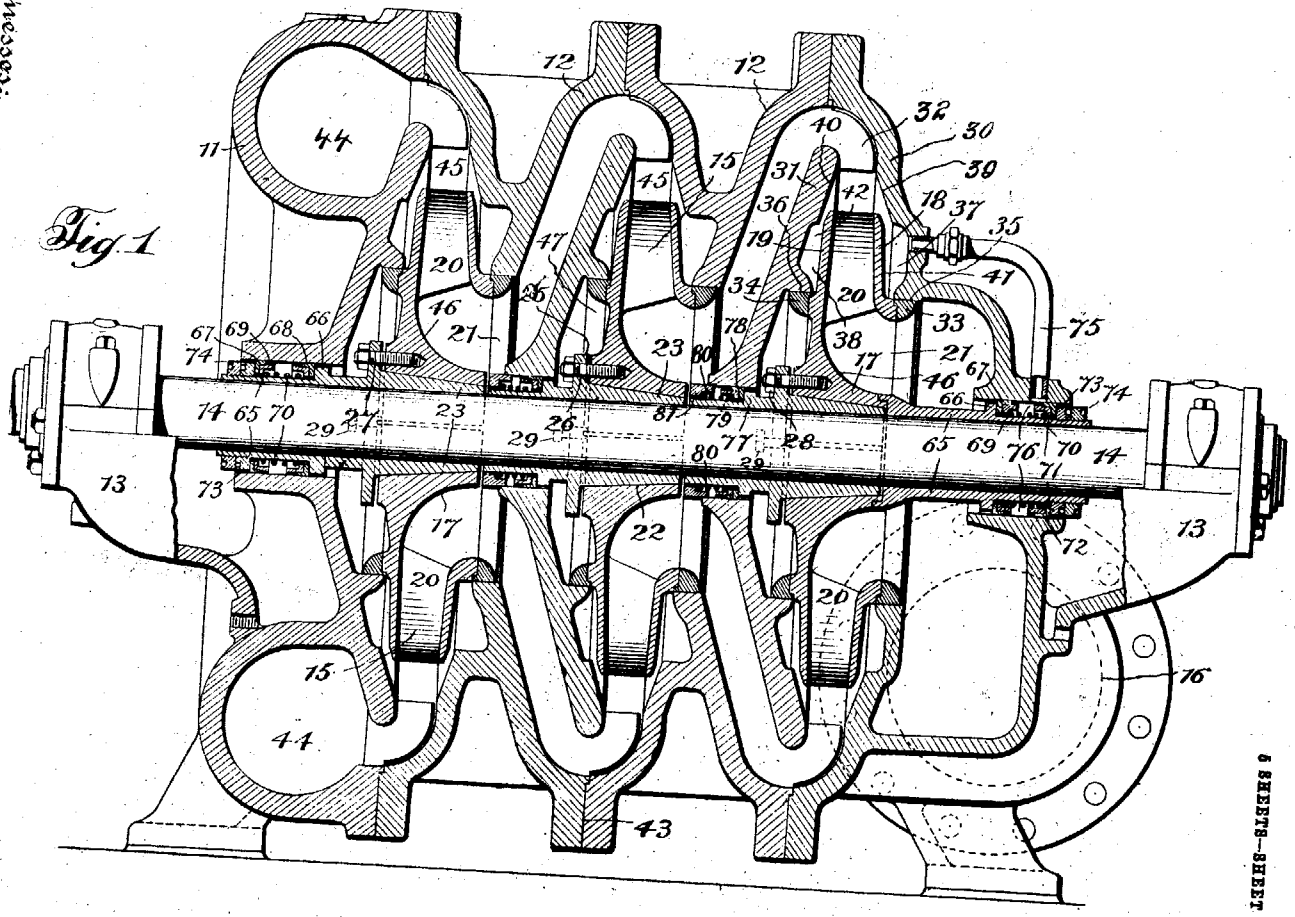

No. 12,584.

REISSUED DEC. 18, 1906.

E. S. LEA & J. DEGEN.
CENTRIFUGAL PUMP.
APPLICATION FILED NOV. 5, 1906.

5 SHEETS—SHEET 1.

Witnesses:
Jas. E. Hutchinson
Lillie Cass

Inventors:
Edward S. Lea & Julius Degen
By Prindle and Williamson, Attorneys

No. 12,584.

REISSUED DEC. 18, 1906.

E. S. LEA & J. DEGEN.
CENTRIFUGAL PUMP.
APPLICATION FILED NOV. 5, 1906.

6 SHEETS—SHEET 2.

Witnesses:
Jas. E. Hutchinson
Lillie Cass

Inventors:
Edward S. Lea & Julius Degen,
by Prindle and Williamson, Attys

No. 12,584.

REISSUED DEC. 18, 1906.

E. S. LEA & J. DEGEN.

CENTRIFUGAL PUMP.

APPLICATION FILED NOV. 5, 1906.

6 SHEETS—SHEET 3.

Witnesses:

Jas. E. Hutchinson

Lillie Cass

Inventors:

Edward S. Lea & Julius Degen, by Prindle and Williamson, Attorneys.

No. 12,584.

REISSUED DEC. 18, 1906.

E. S. LEA & J. DEGEN.

CENTRIFUGAL PUMP.

APPLICATION FILED NOV. 5, 1906.

5 SHEETS—SHEET 4.

Witnesses

Jas. E. Hutchinson

Lillie Cass

Inventors:

Edward S. Lea & Julius Degen, by Prindle and Williamson, Attorneys

No. 12,584.

REISSUED DEC. 18, 1906.

E. S. LEA & J. DEGEN.
CENTRIFUGAL PUMP.
APPLICATION FILED NOV. 5, 1906.

5 SHEETS—SHEET 5.

Witnesses:
Jas. E. Hutchinson
Lillie Cass

Inventors:
Edward S. Lea
Julius Degen,
By Prindle and Williamson Attorneys:

UNITED STATES PATENT OFFICE.

EDWARD S. LEA AND JULIUS DEGEN, OF TRENTON, NEW JERSEY, ASSIGNORS, BY MESNE ASSIGNMENTS, TO LEA-DEGEN PUMP COMPANY, OF TRENTON, NEW JERSEY, A CORPORATION OF NEW JERSEY.

CENTRIFUGAL PUMP.

No. 12,584. Specification of Reissued Letters Patent. Reissued Dec. 18, 1906.

Original No. 790,795, dated May 23, 1905. Application for reissue filed November 5, 1906. Serial No. 342,162.

*To all whom it may concern:*

Be it known that we, EDWARD S. LEA and JULIUS DEGEN, of Trenton, county of Mercer, State of New Jersey, did invent certain new and useful Improvements in Centrifugal Pumps, for which Letters Patent No. 790,795 were issued upon the 23d day of May, 1905, which Letters Patent have been found to be inoperative and defective and not to cover fully the invention set forth in the specification and shown in the drawings, which were filed by us in the Patent Office on the 24th day of March, 1905, preparatory to the obtaining of said Letters Patent. Now, therefore, being desirous of reissuing said Letters Patent we do hereby declare the following to be a full and clear specification thereof.

The object of our invention has been to provide a centrifugal pump which shall have, among others, the following advantages: that of having a casing which in the instance of multistage pumps consists of a series of sections, one for each impeller, united in planes transverse to the shaft, the entire casing being divided parallel to the shaft, whereby with one set of patterns pumps of any number of stages can be made and whereby access may be had to the interior of the pump with the greatest facility; that of having the division of the casing which is parallel to the shaft occur substantially in the plane of the axis of the shaft and extend through the bearings of the shaft, whereby when the cover is removed the shaft and all of the elements carried thereby may be removed together; that of having means for securing the impellers to the shaft so that they may be readily removed from the shaft without injury; and to such ends our invention consists in the centrifugal pump hereinafter specified.

One embodiment of our invention is illustrated in the accompanying drawings, in which—

Figure 2:
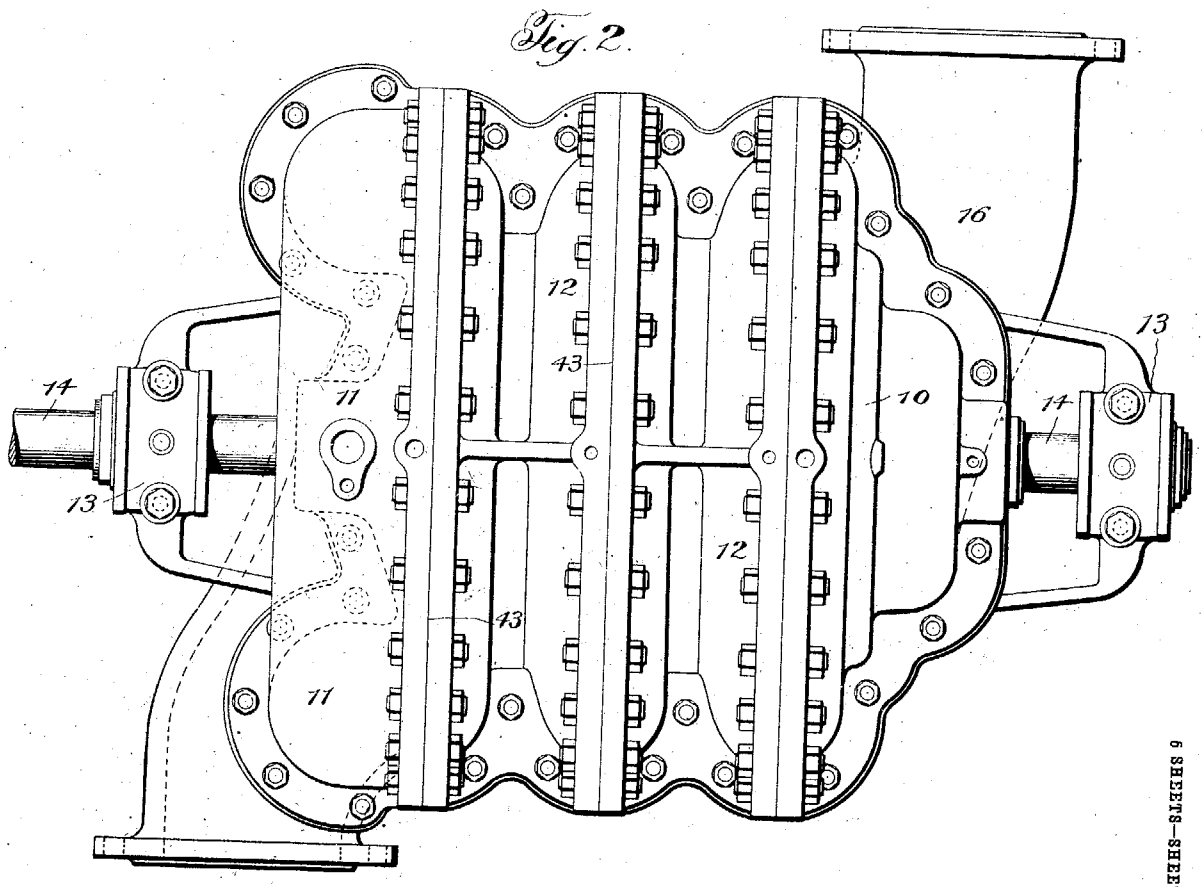
Figure 5:
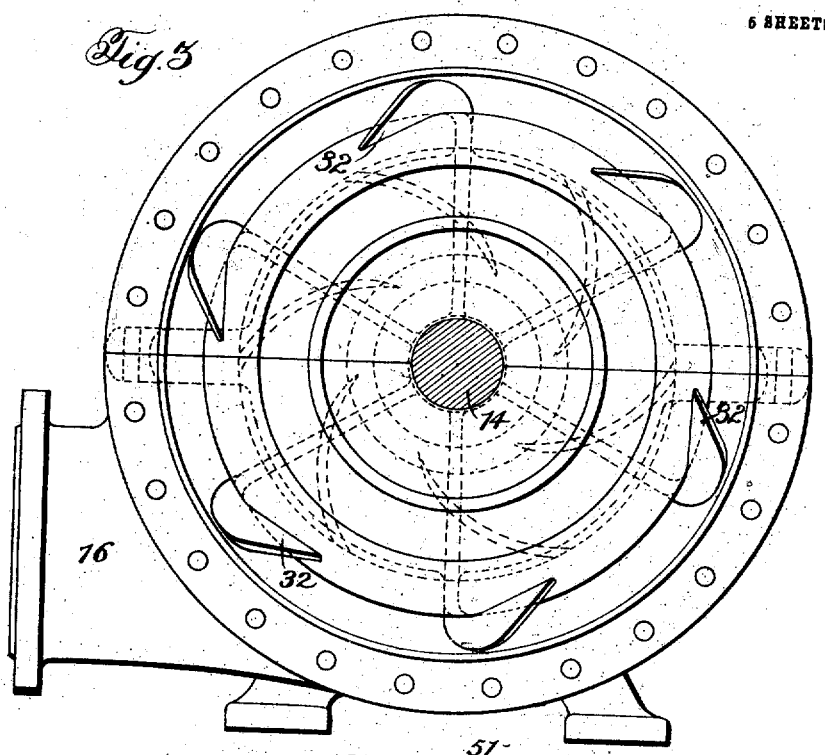
Figure 4:
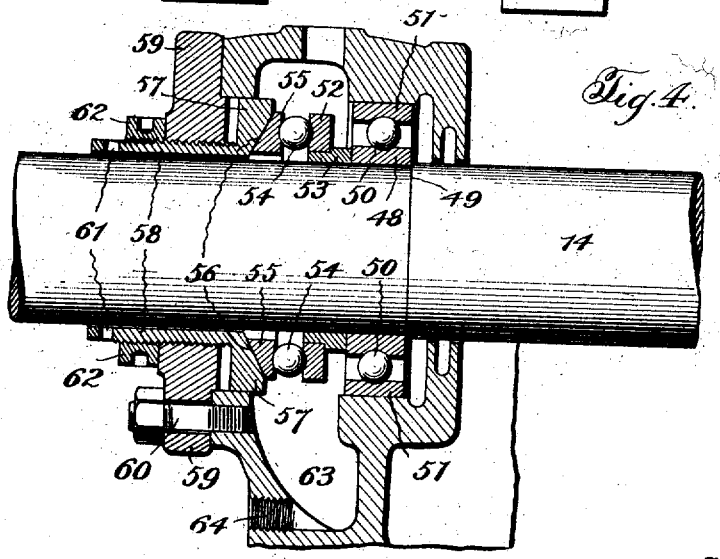
Figure 5:
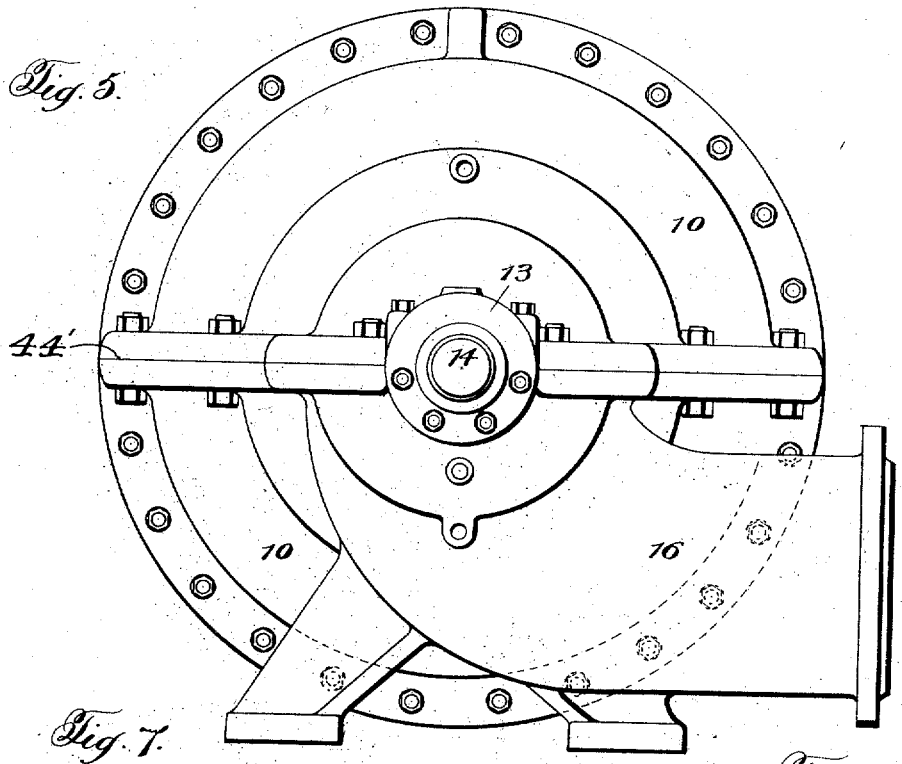
Figure 7:
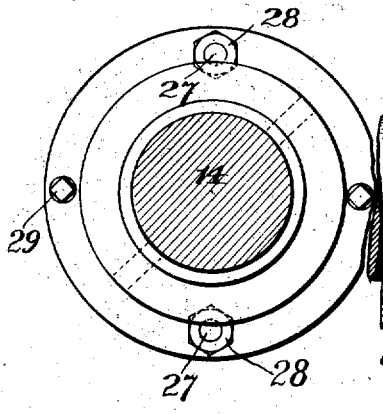
Figure 6:
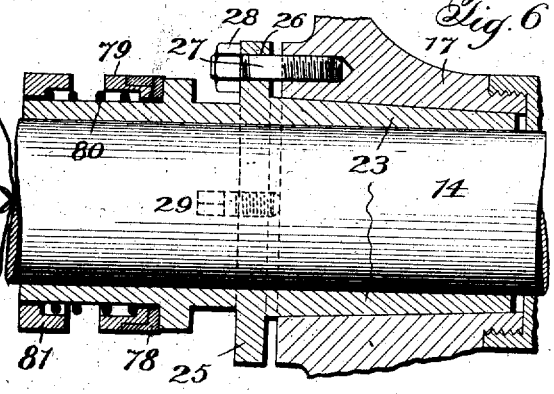
Figure 8:
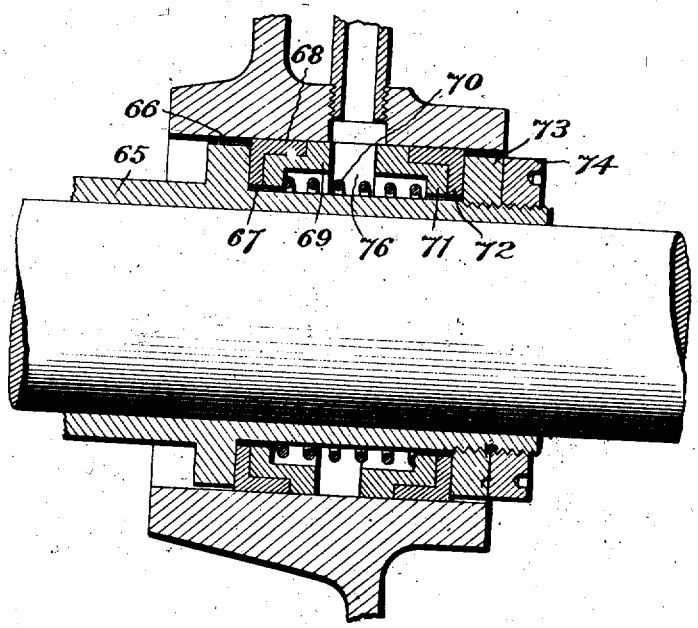
Figure 9:
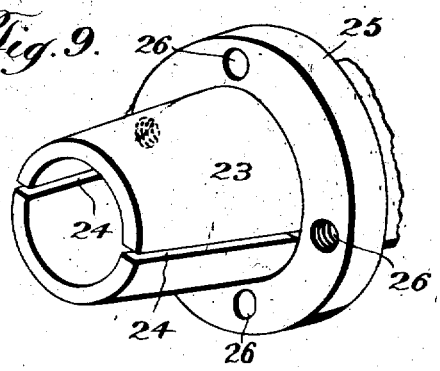

Figure 1 is a vertical longitudinal section of a multistage pump embodying said invention. Fig. 2 is a top plan view thereof. Fig. 3 is an end elevation of one of the sections of the casing. Fig. 4 is a vertical sectional view of one of the shaft-bearings. Fig. 5 is an end view of the suction end of the pump-casing. Fig. 6 is a sectional view of the means for securing the impeller to the shaft and of one of the automatically-adjustable packings. Fig. 7 is an end view of the means for securing the impeller to the shaft. Fig. 8 is an enlarged sectional view of the packing at one end of the casing, and Fig. 9 is a perspective view of the sleeve for securing the impeller to the shaft.

In the said embodiment of our invention we provide a casing consisting of a suction-head 10, a delivery-head 11, and, if desired, intermediate sections 12. Both the heads and all of the sections are divided horizontally, and bearing-brackets 13 are formed on the lower halves of the heads, in which is mounted a shaft 14, carrying impellers 15. The suction-head has an inlet-pipe 16, which is preferably formed in one piece with the lower half of such head, the head being divided into upper and lower halves, to be later referred to. The impellers consist of hubs 17, carrying front and rear walls 18 and 19, respectively, which are connected by curved vanes 20, the front wall having an opening 21 for the entrance of the water into the impeller. The hub 17 is provided with a conical bore 22, that is adapted to fit over the conical end 23 of a sleeve, said end being provided with slots 24 to make it compressible. The sleeve has a flange 25, having holes 26, through which freely pass bolts 27, that are secured in the hub, the said bolts having nuts 28, which bear against the said sleeve and which when turned serve to draw the hub onto the sleeve. Bolts or set-screws 29 are threaded in the said flange and can be screwed against the hub to force the hub off the conical portion 23 when it is desired to remove the impeller, and the impeller can thus be removed without injury.

The impeller rotates in a cell between a wall 30, formed by the outer shell of the casing, and a partition 31, that is supported within the casing by means of deflectors 32, which unite the partition with the casing. The impeller carries two preferably non-corrosive rings 33 and 34, respectively, which respectively make running-joints with annular surfaces 35 and 36, that are formed on the casing and partition, the said rings being of considerably less diameter than the impeller. Chambers 37 and 38 are respectively formed in the wall 30 of the casing and in the partition 31 on the opposite side of the impeller, outside of the rings 33 and 34 and near the outer portion of the periphery of the impeller. The walls 39 and 40, forming the entrance to the passages between the deflectors 32, are preferably inclined toward each other, so that passages 41 and 42, respectively, are formed which connect the chambers 37 and 38 with the space outside of the impeller, so that the said passages are close to and substantially in line with the jet of water issuing from the impeller. This construction causes the issuing jet to carry with it the water in the said passages 41 and 42, and thus to create more or less of a suction in the chambers 37 and 38. This action will be later referred to more fully.

The deflectors 32 begin at a point somewhat outside of the impeller and directly over it and at such point have a direction substantially tangent to the direction of the flow of water from the impeller. They then pass over the partition 31 and downward toward the entrance to the next impeller. The deflectors are preferably cast entirely in one piece with the sections 12, and the division 43 between the first section 12 and the suction-head 10 is preferably at the top of the deflectors 32. Each section 12 preferably extends from the plane of one partition 31 to the plane of the next partition 31, so that upon separating the casing at the division 43 an impeller can be gotten at. The impellers are preferably alike, except that the hub of the first impeller has a special screw-thread, to be later referred to, and the casing-sections 12 are preferably all alike, so that with one set of patterns representing these parts a multistage pump of any number of stages can be formed, and by omitting the sections 12 a single-stage pump can be made by the use of the suction and delivery heads and of a single impeller. The delivery-head has the usual volute 44, through which the water is delivered by the pump.

We not only provide the casing with vertical divisions 43, by which the casing can be built up of sections, but we divide the entire casing thus formed in a horizontal plane at 44′, which preferably passes through the axis of the shaft.

By this construction we are not only able to build a pump of any number of stages from a single set of patterns, but the upper half of the casing may be removed with the greatest facility to afford access to all of the impellers or to permit the shaft and the impellers to be removed from the casing. When an obstruction is caught in the pump, it is almost always caught in the first impeller, since if it passes through the first impeller it can pass through all of the remaining impellers. Our double-parted casing enables us to get at the first impeller with the minimum expenditure of time and effort, since the upper half of the suction-head only need be removed to afford access to the first impeller. All the remainder of the casing need not be disturbed. This not only saves the time and trouble of removing the bolts or other fastenings which secure the casing together, but it avoids disturbing the packings at the joints in the casing and about the shaft.

Since centrifugal pumps run at a high velocity and develop large forces, the problem of balancing them is a serious one. Without unduly increasing the friction it is impracticable to make the joints between the rings 33 and 34 and the casing tight enough to prevent leakage. As the pressure of the water that has been through the impeller and reached the passage 45 is greater than that which has not yet entered the impeller, there is a constant leakage from the passage 45 through the chambers 37 and 38 and past the rings 33 and 34. The dynamic force of the water in flowing into the opening 21 and against the opposite wall 46 causes a pressure upon the impeller tending to thrust the shaft strongly to the left, as seen in Fig. 1. The static pressure in the chamber 47 behind the impeller and within the ring 34 is balanced with the static pressure on the corresponding surfaces on the inlet side of the impeller by making the slots 24 in the sleeve sufficiently long so that the water can pass through them and under the hub from one side to the other of the impeller. The static pressure in the chambers 37 and 38 could be made equal by connecting these chambers; but this would still leave the dynamic pressure of the inflow against the wall 46 unbalanced. It is to balance this pressure that the passages 41 and 42 and the chambers 37 and 38 are provided. The sucking action aforedescribed tends to reduce the pressure in the said chambers. By shifting the shaft so as to increase the passage 42 in size and decrease the passage 41, or vice versa, the pressure in the chamber 38 may be made sufficiently larger than that in the chamber 37 to counterbalance the said dynamic force of the inflow. The said sucking action is also desirable, because it decreases the leakage past the rings 33 and 34.

It is desirable to be able to adjust the shaft so as to be able to vary the relative sizes of the passages 41 and 42 and for the further reason that wear causes slight variations between the position of the mouth of the impeller and the walls 39 and 40, which must be compensated for in order to get proper pressure in the chambers 37 and 38. When it is considered that the area of the impeller that is exposed to the pressure in either of these chambers is large and that a slight variation in pressure is multiplied by the said area, the importance of accurate adjustment of the passages 41 and 42 will be seen. The sucking action is not wholly due to the action of the jet of water issuing from the impeller, but is partly due to the water clinging to the surface of the impeller as it is drawn out by centrifugal action.

In order to adjust the impellers with reference to the walls 39 and 40, the bearings of the shaft are preferably formed in the manner which is the subject of the Patent No. 812,756, granted February 13, 1906, upon our application. In this bearing a ball-race 48 is seated against a shoulder 49, formed on the shaft, and the balls 50 are interposed between such race and an outer race 51, that is held in a bore formed between the cap of the bearing and the bracket 13. The balls 50 support the weight of the shaft and impeller. In order to enable the shaft to be adjusted longitudinally, a ball-race 52 is seated upon a collar 53, that is mounted on the shaft and rests against the race 48, and balls 54 are interposed between the race 52 and a race 55, whose outer face 56 is spherical and bears against a correspondingly-shaped surface on a flange 57, that is formed on a sleeve 58. The said sleeve has an exterior screw-thread that is engaged by a thread formed in a hole in a collar 59, that may be secured to the bracket 13 by bolts 60. The sleeve 58 is provided with holes 61 for a spanner-wrench or with other means for engagement for turning it, and a lock-nut 62, mounted on the said shaft, serves to lock the sleeve in adjusted position. The bearing has an oil-chamber 63 with an outlet 64.

In order to pack the joints where the shaft passes out of the casing, we preferably use the construction illustrated in Fig. 8, and which is the subject of the patent granted on our application, February 6, 1906, No. 811,934. This packing (illustrated in Figs. 1 and 8) consists of a sleeve 65, which in the case of the right-hand packing, as seen in Fig. 1, is screwed onto the hub of the first impeller and which in the case of the left-hand packing, as seen in Fig. 1, is formed in one piece with the sleeve that supports the impeller. The sleeve 65 carries a flange 66, against which bears a vertical web 67 of an annular packing having a cylindrical web 68, that bears against the casing. A ring 69 is pressed against the packing by a spring 70, whose opposite end bears against a ring 71, that forces a similar but reversibly-arranged packing 72 against a nut 73, that is threaded on the sleeve 65, a lock-nut 74 being provided to screw the nut in place. In order to seal the packing in the right-hand bearing, as seen in Fig. 1, to prevent air from leaking into the cell of the first impeller, a pipe 75 leads water from both the impellers to the space 76 between the rings 69 and 71, and thus tends to force said rings against their seats and seals the packing.

The joints within the casing where the shaft passes through the partition consist of a collar 77 on the sleeve on which the impellers are mounted, a packing 78, similar to those before described, and a ring 79, that is pressed by a spring 80 against the said packing, the opposite end of the spring being sustained by a ring 81, that is secured to the partition. All of the sections may be formed independently of the sleeve upon which the impeller is supported. The springs in the packing cause the packing to follow the flange 77 in any adjustment of the shaft that may be made.

The operation of our pump will be seen from the foregoing description, but may be summarized as follows: The water enters through the pipe 16 and flows into the impeller through the opening 21. The vanes within the impeller cause the water to rotate and impart pressure to it by centrifugal action. The water is caught by the deflectors 32, which gradually change its direction, so that it is smoothly carried over the partition and delivered at the inlet of the next impeller. The pressure of the water in the passage 45 is higher than it is at the entrance 21, and the water therefore seeks to pass through the passages 41 and 42 and to leak by the rings 33 and 34. This action is retarded and to some extent counteracted upon by the suction caused in the chambers 37 and 38, due to the fact that the passages 41 and 42 are close to and tangent to the jet issuing from the impeller, so that the air and water in said passages are caught by the said jet and carried between the deflectors, and to the fact that water in the said chambers 37 and 38 adheres to the outer surface of the said impeller and is thrown by centrifugal action outward. By means of the adjustable bearings the relative sizes of the passages 41 and 42 are adjusted so that the pressure in the chamber 37 is enough lower than the pressure in the chamber 38 to counterbalance the dynamic force due to the striking of the water against the surface 46 as it passes through the entrance 21 of the impeller. The static pressure in the chamber 47 is rendered the same as that at the entrance of the impeller by the communication afforded by the slots 24.

It will be observed that our pump has the advantage that with one set of patterns a pump of any number of stages can be constructed and that while affording this great advantage the entire upper half of the casing can be readily removed to enable the shaft and impellers to be gotten at. Our pump has the further advantage that the first impeller can be gotten at by the removal of only a small portion of the casing.

Means are afforded for securely fastening the impellers to the shaft and at the same time enabling them to be readily removed without danger of mutilation.

While we have illustrated in the foregoing description the preferred embodiment of our pump, we desire it to be understood that our invention is not confined to the particular form of mechanism described, and we desire not to limit our claims beyond the necessary intendment of their terms and the requirements of the prior art.

Having thus described our invention, we claim—

1. In a centrifugal pump, the combination of a shaft, an impeller thereon, and a casing inclosing said impeller, said casing comprising suction and delivery heads both of said heads being divided in a plane parallel to said shaft, the several parts of said casing meeting in planes transverse to the shaft.

2. In a centrifugal pump, the combination of a shaft, a plurality of impellers on said shaft, and a casing inclosing said impellers, said casing being divided transversely to the shaft in the region of the greatest diameter of each impeller and being divided substantially parallel to said shaft.

3. A centrifugal pump consisting of a casing, a shaft, and a plurality of impellers on said shaft, said casing consisting of a series of separate sections meeting in planes transverse to the shaft, one section for each impeller, said sections being divided on a common plane substantially parallel to said shaft.

4. In a centrifugal pump, the combination of a shaft, a plurality of impellers on said shaft, and a casing comprising heads and intermediate sections, said heads and sections meeting in planes transverse to the shaft, said heads and sections being divided in a plane parallel to said shaft.

5. In a device of the character specified, the combination with a casing made up of a plurality of sections, and comprising cells with chambers in communication therewith, a rotatably-mounted shaft, impellers carried by said shaft, a device located on said shaft for removably securing the impellers to the shaft, automatic packing devices carried by said devices, and means for shifting the shaft longitudinally to adjust the impellers relatively to the walls of the cells whereby to vary the outlets from the chambers to the cells.

6. In a device of the character specified, the combination with a casing made up of a plurality of sections united in two transverse directions, and comprising cells with chambers in communication therewith, a rotatably-mounted shaft, impellers carried by said shaft, devices located on said shaft for removably securing the impellers to the shaft, automatic packing devices carried by said devices, and means for shifting said shaft longitudinally to adjust the impellers relatively to the walls of the cells whereby to vary the size of the outlets from the chambers to the cells.

7. In a device of the character specified, the combination with a casing, made up of a plurality of sections, and having cells with chambers on each side thereof, a rotatably-mounted shaft, impellers carried by said shaft, sleeves located between said shaft and impellers for removably securing the latter to the shaft, means for shifting said shaft longitudinally to a fixed position to adjust the impellers relatively to the walls of the cells whereby to vary the outlets from said chambers to the cells, means to automatically pack the shaft in the walls of said casing, and means to seal the packing means.

8. In a device of the character specified, the combination with a casing made up of a plurality of sections united in two transverse directions, and having cells with chambers in communication therewith, a rotatably-mounted shaft, impellers carried by said shaft, devices located between said shaft and impellers for removably securing the latter to the shaft, means for shifting said shaft longitudinally to a fixed position to adjust the impellers relatively to the walls of the cells whereby to vary the suction on either side of the impellers, means to automatically pack the shaft in the walls of said casing, and means to seal the packing means.

9. In a device of the character specified, the combination with a casing made up into halves, and said halves made up into sections and comprising cells with chambers communicating therewith, a rotatably-mounted shaft, impellers carried by said shaft, devices located on said shaft for removably securing the impellers to the shaft, means carried by the devices to automatically pack the shaft in the walls of the casing, and means for shifting said shaft longitudinally to adjust the impellers relatively to the walls of the cells whereby to balance the device, said casing halves being separable for access to the parts therein.

10. In a device of the character specified, the combination with a casing made up of a plurality of sections, and comprising two halves, and having cells and chambers in communication with said cells, a shaft carried by one half, adjustable bearings carried by said shaft, a series of impelling stages mounted on said shaft, means carried by said shaft for securing to and for effecting a removal of the impellers relatively to said shaft, packing-rings carried by said means, flanges carried by said means, and against which the packing-rings may take, and springs for maintaining the packing-rings in place.

11. In a device of the character specified, the combination with a casing comprising two halves, each composed of sections and having cells with chambers in communication therewith, a rotatably-mounted shaft, an impeller carried by said shaft, devices located on said shaft for removably securing the impeller to the shaft, automatic packing devices carried by said devices, and means for shifting the shaft longitudinally to adjust the impeller relatively to the walls of the cell, whereby to vary the suction on each side of the impeller.

12. In a device of the character specified, the combination with a casing having cells and chambers and made up of a plurality of sections, comprehending two halves, a shaft carried by one half, adjustable bearings for shifting said shaft longitudinally, a series of impelling stages mounted on said shaft and which are shiftable therewith to vary the size of the outlets from the chambers to the cells, means carried by said shaft for securing to and effecting a removal of the impellers relatively to said shaft, automatic packing devices carried by said means, and means suitably mounted for deflecting a fluid from one impeller to another.

13. In a device of the character specified, the combination with a casing having cells and chambers, and made up of a plurality of sections, a shaft carried by one section, adjustable bearings for said shaft, a series of impelling stages mounted on said shaft, and which are shiftable therewith to vary the size of the outlets from the chambers to the cells, split sleeves carried by said shaft, for securing to and effecting a removal of the impellers relatively to the shaft, automatic packing devices carried by said sleeves, and deflectors suitably mounted for deflecting a fluid from one impeller to another.

14. In a device of the character specified, the combination with a casing having cells and chambers communicating therewith, and comprising two halves, made up of a plurality of sections, a shaft carried by one half, adjustable bearings for said shaft, a series of impelling stages mounted on said shaft and which are shiftable therewith to vary the size of the outlets from the chambers to the cells, means carried by said shaft for securing to and effecting a removal of the impellers relatively to said shaft, means suitably mounted for deflecting a fluid from one impeller to another, and means carried by the impeller-securing means to automatically pack the shaft.

15. In a device of the character specified, the combination with a multicellular casing, built up by a plurality of united sections and which is divided into removable halves, and embodying a series of cells, of bearings and standards carried by one of said halves, a shaft carried in said bearings, a series of impelling stages mounted on said shaft and in the cells of said casing, means for adjusting the shaft and thereby the impellers relatively to the walls of the cells, a series of split sleeves mounted on said shaft, and passing through the partition and adapted to secure the impellers to the shaft, a plurality of automatic packing devices carried by the sleeve and adapted to pack the shaft in the openings in the walls of the casing and the partitions, and means to pack the impellers in said partitions.

16. In a device of the character specified, the combination with a multicellular casing having chambers in communication with each cell, said casing being built up of a plurality of united sections, and divided into halves, bearings carried by one half, a shaft carried in said bearings, a series of impelling stages mounted on said shaft, and in the cells of said casing, a series of sleeves mounted on said shaft, and adapted to secure the impellers thereto, a plurality of automatic spring packing devices between the walls of the casing, the partitions and the shaft, a plurality of deflectors for the changing of the course of the fluid as it is thrown from the impellers, said bearings being adjustable whereby to shift the shaft and the impellers so as to move the impellers relatively to the walls of the cells, whereby to change the size of the outlets from the chambers to the cells to regulate the operation of the pump.

17. In a device of the character specified, the combination with a casing which is divided into a plurality of cells by substantially equidistantly disposed partitions, and which casing is divided into halves, means for securing said halves together, bearings carried by one half, an elongated shaft carried in said bearings, impellers mounted on said shaft, means for shifting the shaft and thereby the impellers relatively to the walls of the cells, whereby to properly dispose the impellers in said cells, means carried by said shaft for supporting the impellers thereon, and automatically-acting packings carried by said means for packing the shaft where it passes through the casing and the partitions.

In testimony that we claim the foregoing we have hereunto set our hands.

EDWARD S. LEA.
JULIUS DEGEN.

Witnesses:
JOHN P. ATCHLEY,
WILLIAM R. PIPER.